United States Patent
Meng et al.

(10) Patent No.: US 12,120,626 B2
(45) Date of Patent: Oct. 15, 2024

(54) COMMUNICATION METHOD AND APPARATUS

(71) Applicant: HUAWEI TECHNOLOGIES CO., LTD., Shenzhen (CN)

(72) Inventors: Xian Meng, Hangzhou (CN); Yu Wang, Hangzhou (CN); Meixin Lin, Hangzhou (CN); Yunfei Qiao, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 317 days.

(21) Appl. No.: 17/566,754

(22) Filed: Dec. 31, 2021

(65) Prior Publication Data

US 2022/0124662 A1  Apr. 21, 2022

Related U.S. Application Data

(63) Continuation of application No. PCT/CN2020/098644, filed on Jun. 28, 2020.

(30) Foreign Application Priority Data

Jul. 2, 2019 (CN) .......................... 201910597933.6

(51) Int. Cl.
*H04W 60/04* (2009.01)
*H04W 60/02* (2009.01)
(Continued)

(52) U.S. Cl.
CPC .......... *H04W 60/04* (2013.01); *H04W 60/02* (2013.01); *H04W 68/005* (2013.01); *H04W 84/06* (2013.01)

(58) Field of Classification Search
None
See application file for complete search history.

(56) References Cited

U.S. PATENT DOCUMENTS

D1,014,543 S  *  2/2024  Wang ........................... D14/486
2005/0054349 A1*  3/2005  Balachandran ....... H04W 60/04
                                                     455/519
(Continued)

FOREIGN PATENT DOCUMENTS

CN    101494852 A    7/2009
CN    101605338 A    12/2009
(Continued)

OTHER PUBLICATIONS

3GPP TS 24.501 V0.1.0 (Nov. 2017); 3rd Generation Partnership Project;Technical Specification Group Core Network and Terminals; Non-Access-Stratum (NAS) protocol for 5G System (5GS); Stage 3(Release 15); total 16 pages.
(Continued)

*Primary Examiner* — Christopher T Wyllie
(74) *Attorney, Agent, or Firm* — Rimon PC

(57) ABSTRACT

Embodiments of this application disclose a communication method. The method includes: A terminal device sends a first message to a network device, where the first message includes one or more listening frequency indexes of one or more first tracking areas that are listened to by the terminal device within a first preset time period. The terminal device receives a second message including first registration area information from the network device. The first registration area information is determined based on the one or more listening frequency indexes. In the embodiments of this application, the accuracy of registration area information obtained by the terminal device can be improved, avoiding waste of communication resources caused by inaccurate registration area information received by the terminal device and improving communication resource utilization and practicality of the communication network.

15 Claims, 7 Drawing Sheets

(51) Int. Cl.
*H04W 68/00* (2009.01)
*H04W 84/06* (2009.01)

(56) References Cited

U.S. PATENT DOCUMENTS

| | | | |
|---|---|---|---|
| 2010/0075698 A1* | 3/2010 | Rune | H04W 68/08 455/458 |
| 2011/0165878 A1* | 7/2011 | Nylander | H04W 60/04 455/436 |
| 2012/0258704 A1* | 10/2012 | Kim | H04W 52/0235 455/422.1 |
| 2014/0348064 A1* | 11/2014 | Jeong | H04W 36/0022 370/328 |
| 2017/0181084 A1 | 6/2017 | Sun | |
| 2017/0374574 A1* | 12/2017 | Lee | H04W 24/08 |
| 2018/0206188 A1* | 7/2018 | Nam | H04W 48/18 |
| 2019/0174449 A1* | 6/2019 | Shan | H04W 60/04 |
| 2020/0029263 A1* | 1/2020 | Lin | H04W 48/20 |
| 2020/0092774 A1* | 3/2020 | Sharma | H04W 36/00835 |
| 2020/0126416 A1* | 4/2020 | Montemurro | H04W 4/44 |
| 2020/0187209 A1* | 6/2020 | Tamura | H04W 72/0453 |
| 2020/0288423 A1* | 9/2020 | Lindheimer | H04W 60/00 |
| 2020/0314861 A1* | 10/2020 | Goel | H04W 72/563 |
| 2020/0374828 A1* | 11/2020 | Ying | H04W 4/50 |
| 2022/0124662 A1* | 4/2022 | Meng | H04W 68/005 |
| 2023/0027290 A1* | 1/2023 | Chen | H04W 52/367 |
| 2024/0031966 A1* | 1/2024 | Chen | H04W 56/009 |

FOREIGN PATENT DOCUMENTS

| | | |
|---|---|---|
| CN | 104852761 A | 8/2015 |
| CN | 106034297 A | 10/2016 |
| CN | 106572481 A | 4/2017 |
| WO | 2016169473 A1 | 10/2016 |
| WO | 2017099650 A1 | 6/2017 |

OTHER PUBLICATIONS

Zte Corporation et al: "Further consideration on tracking area management in NTN", 3GPP Draft; R2-1906269—Further Consideration On Tracking Area Management in NTN, 3rd Generation Partnership Project (3GPP), Mobile Competence Centre; 650, Route Des Lucioles; F-06921 Sophiaantipoli, vol. RAN WG2, No. Reno, USA; May 13, 2019-May 17, 2019 May 13, 2019 (May 13, 2019), XP051729737; 7 pages.

Huawei: "None Ambiguous FFS removal", EPO Form 1703 01.91 TRI3GPP Draft; R3-192733_None_Ambigous_FFS_Removal_RO, 3rdGeneration Partnership Project (3GPP), Mobilecompetence Centre ; 650, Route Des Lucioles; F-06921 Sophia-Antipolis Cedex; France, vol. RAN WG3, No. Reno, Nevada, US; May 13, 2019-May 17, 2019 May 13, 2019 (May 13, 2019), XP05173200; 11 pages.

"3rd Generation Partnership Project; Technical Specification Group Radio Access Network; Solutions for NR to support non-terrestrial networks (NTN) (Release 16)", 3GPP Standard; Technical Report; 3GPP TR 38.821, 3rd Generation Partnership Project (3GPP), Mobile Competence Centre; 650, Route Des Lucioles; F-06921 Sophia-Antipolis Cedex ; France, No. V0.7.0,, Jun. 13, 2019 (Jun. 13, 2019), XP051754097; pp. 1-86.

Zte Corporation et al: "Consideration on TA management in NTN", 3GPP Draft; R2-1900829_Consideration on Tamanagement in NTN, 3rd Generation Partnershipproject (3GPP), Mobile Competence Centre ; 650, Route Des Lucioles; F-06921 Sophia-Antipolis Cedex; France, vol. RAN WG2, No. Athens, Greece; Feb. 25, 2019-Mar. 1, 2019 Feb. 14, 2019 (Feb. 14, 2019), XP051602202; 4 pages.

* cited by examiner

COMMUNICATION METHOD AND APPARATUS

CROSS-REFERENCE TO RELATED APPLICATIONS

This application is a continuation of International Application No. PCT/CN2020/098644, filed on Jun. 28, 2020, which claims priority to Chinese Patent Application No. 201910597933.6, filed on Jul. 2, 2019. The disclosures of the aforementioned applications are hereby incorporated by reference in their entireties.

TECHNICAL FIELD

This application relates to the field of communication technologies, and in particular, to a communication method and apparatus.

BACKGROUND

With continuous development of science and technology, to provide wider wireless network coverage and provide communication services for coverage areas, for example, offshore areas and remote areas, that are without a terrestrial mobile network (also referred to as a terrestrial cellular network), satellite and non-terrestrial networks (NTN), as an important supplement to the terrestrial cellular network, are becoming more widely deplored. However, when the NTN and the terrestrial cellular network coexist, how to properly implement location management of a terminal device in the combination of the satellite and non-terrestrial network and the terrestrial cellular network has become a hot research topic at present.

In the conventional technology, location management of a terminal device in a satellite and non-terrestrial communication network (briefly referred to as a satellite communication network below) and a terrestrial cellular network is implemented by using a tracking area and a registration area. To be specific, a plurality of areas are statically specified on the surface of the Earth, and each area is a tracking area. After accessing the satellite communication network and/or the terrestrial cellular network, the terminal device initiates a request, for example, an initial registration request, a mobility registration update request, or a periodic registration update request, to a core network device. Then, the core network device may determine, based on information such as the context of the terminal device, the registration area information used to indicate one or more tracking areas for the terminal device, and a base station (namely, a communication satellite and/or a terrestrial base station) configures the registration area information for the terminal device. In this way, the location management of the terminal device is implemented. However, in a scenario in which a tracking area list broadcast by a serving cell connected to the terminal device keeps changing, the registration area information configured by the core network device for the terminal device based on information such as the context of the terminal device, is not accurate. Because the geographical location of the terminal device cannot be accurately represented, the terminal device may frequently initiate a registration area information update request to the core network device. This leads to waste of communication resources of the communication network, and reduces communication resource utilization and applicability of the communication network.

SUMMARY

Embodiments of this application provide a communication method and apparatus, to improve the accuracy of registration area information obtained by a terminal device. The methods and apparatus disclosed in this application avoid waste of communication resources caused by inaccurate registration area information of the terminal device, and improves communication resource utilization and practicality of a communication network.

According to a first aspect, an embodiment of this application provides a communication method. The method includes: A terminal device sends a first message to a network device. The first message includes one or more listening frequency indexes of one or more first tracking areas. The one or more first tracking areas are tracking areas listened to by the terminal device within a first preset time period. The one or more listening frequency indexes are used to indicate a frequency used by the terminal to listen to the one or more first tracking areas by the terminal device within the first preset time period. The terminal device receives a second message including first registration area information from the network device. In some embodiments, the first registration area information is determined based on the one or more listening frequency indexes.

In this embodiment of this application, the terminal device sends the listening frequency indexes of the one or more first tracking areas listened to by the terminal device within the first preset time period to a core network device by using a base station, so that the core network device may determine the first registration area information for the terminal device based on the listening frequency index of each first tracking area. Because the registration area information determined by the core network device based on the listening frequency index of each first tracking area has higher precision, the geographical location of the terminal device can be more accurately represented, and the problem that the terminal device has to frequently initiate a registration update request to the core network device caused by inaccurate registration area information is avoided. In addition, it becomes convenient for the terminal device to perform certain operations such as cell reselection. This reduces waste of communication resources of a communication network, and improves communication resource utilization and applicability of the communication network.

In a feasible implementation, the one or more listening frequency indexes are determined based on the first preset time period and one or more listening parameters of the one or more first tracking areas, and the listening parameters include a listening duration or a quantity of listening times.

In a feasible implementation, the one or more listening frequency indexes are determined based on a discrete value of a ratio of the one or more listening parameters to the first preset time period. The listening frequency indexes are obtained through discretization, so that the listening frequency indexes are represented as integers in the first message. This reduces signaling overhead between the terminal device and the network device, and improves the communication resource utilization of the satellite communication system.

In a feasible implementation, the one or more listening parameters are determined based on a tracking area listening historical record corresponding to the terminal device within the first preset time period. The tracking area listening historical record includes one or more pieces of tracking area information of a serving cell of the terminal device, and the one or more pieces of tracking area information are included in a system information block broadcast by the base station.

In a feasible implementation, when detecting that a communication trigger condition is met, the terminal device sends the first message to the network device.

In a feasible implementation, the communication trigger condition includes that one or more second tracking areas listened to by the terminal device are different from one or more third tracking areas indicated by second registration area information obtained through a last registration area information update of the terminal device. In some embodiments, the communication trigger condition is that each of the one or more second tracking areas listened to by the terminal device is different from any of the one or more third tracking areas indicated by the second registration area information.

In a feasible implementation, the communication trigger condition includes that a sum of one or more listening frequency indexes of one or more decision tracking areas is less than a trigger decision threshold. The decision tracking area is a shared tracking area between the one or more second tracking areas listened to by the terminal device and the one or more third tracking areas indicated by second registration area information obtained through a last registration area information update of the terminal device. In a case in which it is determined that the second registration area information being used by the terminal device does not accurately reflect the geographical location of the terminal device based on the listening frequency index of the tracking area, the terminal device is triggered to obtain new registration area information. It avoids the scenario in which the core network device cannot effectively initiate paging to the terminal device because the second registration area information of the terminal device is inaccurate. This reduces paging pressure of the core network device, and improves the applicability of the communication network.

In a feasible implementation, the one or more listening frequency indexes of the one or more decision tracking areas are determined based on a second preset time period and one or more listening parameters of the one or more decision tracking areas, and the listening parameters include a listening duration or a quantity of listening times.

In a feasible implementation, the first registration area information is used to update the second registration area information obtained through the last registration area information update of the terminal device. Because the first registration area information can more accurately represent the geographical location of the terminal device, a tracking area indicated by the registration area information (namely, the first registration area information), that is obtained through the update and is associated with the terminal device can better match a tracking area covered by a satellite communication cell connected to the terminal device. In this way, the quantity of times of initiating a registration area information update request by the terminal device can be effectively reduced. This avoids waste of the communication resources of the communication network.

In a feasible implementation, the first message is a registration update request message, and/or the second message is a registration update receive message.

In a feasible implementation, the first message further includes one or more fourth tracking areas last listened to by the terminal device before the terminal device detects that the communication trigger condition is met, and the one or more fourth tracking areas are used to determine the first registration area information.

According to a second aspect, an embodiment of this application provides a communication method. The method includes: A network device receives a first message from a terminal device. In some embodiments, the first message includes one or more listening frequency indexes of one or more first tracking areas listened to by the terminal device within a first preset time period. The one or more listening frequency indexes are used to indicate a frequency used by the terminal device to listen to the one or more first tracking areas within the first preset time period. The network device sends a second message including first registration area information to the terminal device. In some embodiments, the first registration area information is determined based on the one or more listening frequency indexes.

In this embodiment of this application, a core network device determines the more accurate first registration area information for the terminal device based on the listening frequency index of each first tracking area provided by the terminal device. This avoids the problem that the terminal device frequently initiates a registration update request to the core network device caused by inaccurate registration area information. In addition, it becomes convenient for the terminal device to perform certain operations such as cell reselection. This reduces waste of communication resources of a communication network, and improves communication resource utilization and applicability of the communication network.

In a feasible implementation, the network device may obtain a listening frequency index threshold. In some embodiments, the listening frequency index threshold is used to select the one or more first tracking areas.

In a feasible implementation, the network device may determine one or more target tracking areas from the one or more first tracking areas based on the listening frequency index threshold and the one or more listening frequency indexes. The network device may determine the first registration area information. In some embodiments, the first registration area information includes one or more indicators of the one or more target tracking areas. The one or more target tracking areas frequently listened to by the terminal device are selected based on the listening frequency index of each first tracking area, and the first registration area information corresponding to the terminal device is determined based on the indicators of the target tracking areas, so that the determined first registration area information can more accurately represent the geographical location of the terminal device.

In a feasible implementation, the target tracking area is a first tracking area whose listening frequency index is equal to or greater than the listening frequency index threshold.

In a feasible implementation, a sum of one or more listening frequency indexes of the one or more target tracking areas is equal to or greater than the listening frequency index threshold; and the one or more listening frequency indexes of the one or more target tracking areas are greater than the one or more listening frequency indexes of the one or more non-target tracking areas. The non-target tracking areas are the first tracking areas in the one or more first tracking areas other than the one or more target tracking areas.

In a feasible implementation, the first message further includes one or more fourth tracking areas last listened to by the terminal device before the terminal device detects that the communication trigger condition is met. The one or more fourth tracking areas are used to determine the first registration area information.

In a feasible implementation, the network device determines one or more candidate tracking areas from the one or more first tracking areas based on the listening frequency index threshold and the one or more listening frequency indexes. The network device determines one or more target tracking areas based on the one or more candidate tracking areas and the one or more fourth tracking areas. The network device determines the first registration area information. In some embodiments, the first registration area information includes one or more indicators of the one or more target tracking areas.

In a feasible implementation, the candidate tracking area is a first tracking area whose listening frequency index is equal to or greater than the listening frequency index threshold.

In a feasible implementation, a sum of one or more listening frequency indexes of the one or more candidate tracking areas is equal to or greater than the listening frequency index threshold; and the one or more listening frequency indexes of the one or more candidate tracking areas are greater than the one or more listening frequency indexes of the one or more non-candidate tracking areas. The non-candidate tracking areas are the first tracking areas in the one or more first tracking areas other than the one or more candidate tracking areas.

In a feasible implementation, the first message is a registration update request message, and/or the second message is a registration update receive message.

In a feasible implementation, the network device pages the one or more first tracking areas. In some embodiments, the paging priorities corresponding to the one or more first tracking areas are determined based on the one or more listening frequency indexes. A paging priority corresponding to a first tracking area whose listening frequency index is a first parameter is higher than a paging priority corresponding to a first tracking area whose listening frequency index is a second parameter, and the first parameter is greater than the second parameter. The tracking areas that can page the terminal device and the paging priority of each tracking area that can page are determined based on the listening frequency index of each first tracking area provided by the terminal device, so that ineffective paging operations performed in tracking areas far from the terminal device can be reduced. In addition, the speed of paging the terminal device may be improved by using paging priorities. This reduces the usage of communication resources of the communication network, and improves the applicability of the communication network.

According to a third aspect, an embodiment of this application provides a communication method. The method includes: A base station receives a first message from a terminal device, and forwards the first message to a core network device. In some embodiments, the first message includes one or more listening frequency indexes of one or more first tracking areas, and the one or more first tracking areas are tracking areas listened to by the terminal device within a first preset time period. The one or more listening frequency indexes are used to indicate a frequency used by the terminal device to listen to the one or more first tracking areas by the terminal device within the first preset time period. The base station receives a second message from the core network device, and forwards the second message to the terminal device. In some embodiments, the second message includes first registration area information, and the first registration area information is determined based on the one or more listening frequency indexes.

In a feasible implementation, the one or more listening frequency indexes are determined based on the first preset time period and one or more listening parameters of the one or more first tracking areas, and the listening parameters include a listening duration or a quantity of listening times.

In a feasible implementation, the one or more listening frequency indexes are determined based on a discrete value of a ratio of the one or more listening parameters to the first preset time period.

In a feasible implementation, the one or more listening parameters are determined based on a tracking area listening historical record corresponding to the terminal device within the first preset time period.

In a feasible implementation, the tracking area listening historical record includes indicators of and listening moments of the tracking areas in one or more pieces of tracking area information listened to by the terminal device. The one or more pieces of tracking area information are included in a system information block broadcast by the base station.

In a feasible implementation, the first registration area information is used to update second registration area information obtained through a last registration area information update of the terminal device.

According to a fourth aspect, an embodiment of this application provides a communication method. The method includes: A core network device receives a first message forwarded by a base station. In some embodiments, the first message includes one or more listening frequency indexes of one or more first tracking areas. The one or more first tracking areas are tracking areas listened to by a terminal device within a first preset time period. The one or more listening frequency indexes are used to indicate a frequency used by the terminal device to listen to the one or more first tracking areas within the first preset time period. The core network device sends a second message including first registration area information to the base station. In some embodiments, the first registration area information is determined by the core network device based on the one or more listening frequency indexes.

In a feasible implementation, the core network device obtains a listening frequency index threshold. In some embodiments, the listening frequency index threshold is used to select the one or more first tracking areas.

In a feasible implementation, the core network device determines one or more target tracking areas from the one or more first tracking areas based on the listening frequency index threshold and the one or more listening frequency indexes. The core network device determines the first registration area information. In some embodiments, the first registration area information includes one or more indicators of the one or more target tracking areas.

In a feasible implementation, the target tracking area is a first tracking area whose listening frequency index is equal to or greater than the listening frequency index threshold.

In a feasible implementation, a sum of one or more listening frequency indexes of the one or more target tracking areas is equal to or greater than the listening frequency index threshold; and the one or more listening frequency indexes of the one or more target tracking areas are greater than one or more listening frequency indexes of one or more non-target tracking areas. The non-target tracking areas are first tracking areas in the one or more first tracking areas other than the one or more target tracking areas.

In a feasible implementation, the first message further includes one or more fourth tracking areas last listened to by the terminal device before the terminal device detects that a communication trigger condition is met, and the one or more fourth tracking areas are used to determine the first registration area information.

In a feasible implementation, the core network device determines one or more candidate tracking areas from the one or more first tracking areas based on the listening frequency index threshold and the one or more listening frequency indexes. The core network device determines one or more target tracking areas based on the one or more candidate tracking areas and the one or more fourth tracking areas. The core network device determines the first registration area information. In some embodiments, the first registration area information includes one or more indicators of the one or more target tracking areas.

In a feasible implementation, the candidate tracking area is a first tracking area whose listening frequency index is equal to or greater than the listening frequency index threshold.

In a feasible implementation, a sum of one or more listening frequency indexes of the one or more candidate tracking areas is equal to or greater than the listening frequency index threshold; and the one or more listening frequency indexes of the one or more candidate tracking areas are greater than the one or more listening frequency indexes of the one or more non-candidate tracking areas. The non-candidate tracking areas are first tracking areas in the one or more first tracking areas other than the one or more candidate tracking areas.

In a feasible implementation, the first message is a registration update request message, and/or the second message is a registration update receive message.

In a feasible implementation, the core network device pages the one or more first tracking areas. In some embodiments, the paging priorities corresponding to the one or more first tracking areas are determined based on the one or more listening frequency indexes, a paging priority corresponding to a first tracking area whose listening frequency index is a first parameter is higher than a paging priority corresponding to a first tracking area whose listening frequency index is a second parameter, and the first parameter is greater than the second parameter.

According to a fifth aspect, an embodiment of this application provides a communication method. The method includes: A terminal device sends a first message to a network device. In some embodiments, the first message includes one or more listening frequency indexes of one or more first tracking areas, and the one or more first tracking areas are tracking areas listened to by the terminal device within a first preset time period. The one or more listening frequency indexes are used to indicate a frequency used by the terminal device to listen to the one or more first tracking areas within the first preset time period. The one or more listening frequency indexes are used to determine the paging priorities of the one or more first tracking areas.

In a feasible implementation, the one or more listening frequency indexes are determined based on the first preset time period and one or more listening parameters of the one or more first tracking areas, and the listening parameters include a listening duration or a quantity of listening times.

In a feasible implementation, the one or more listening frequency indexes are determined based on a discrete value of a ratio of the one or more listening parameters to the first preset time period.

According to a sixth aspect, an embodiment of this application provides a communication method. The method includes: A network device receives a first message from a terminal device. In some embodiments, the first message includes one or more listening frequency indexes of one or more first tracking areas listened to by the terminal device within a first preset time period. The one or more listening frequency indexes are used to indicate a frequency used by the terminal device to listen to the one or more first tracking areas within the first preset time period. The network device pages the one or more first tracking areas. In some embodiments, the paging priorities corresponding to the one or more first tracking areas are determined based on the one or more listening frequency indexes. A paging priority corresponding to a first tracking area whose listening frequency index is a first parameter is higher than a paging priority corresponding to a first tracking area whose listening frequency index is a second parameter, and the first parameter is greater than the second parameter. The tracking areas that can page the terminal device and the paging priority of each tracking area that can page the terminal device are determined based on the listening frequency index of each first tracking area provided by the terminal device, so that ineffective paging operations performed in some tracking areas far from the terminal device can be avoided. In addition, the speed of paging the terminal device may be improved by using a paging priority. This reduces the unnecessary usage of communication resources of a communication network, and improves applicability of the communication network.

According to a seventh aspect, an embodiment of this application provides an apparatus, where the apparatus may be a terminal device. The apparatus includes processors or circuits or modules configured to perform the communication method provided in any one of the possible implementations of the first aspect and/or the fifth aspect. Therefore, the apparatus can also achieve beneficial effects (or advantages) of the communication method provided in the first aspect and/or the fifth aspect.

According to an eighth aspect, an embodiment of this application provides an apparatus, where the apparatus may be a network device. The apparatus includes processors or circuits or modules configured to perform the communication method provided in any one of the possible implementations of the second aspect and/or the sixth aspect. Therefore, the apparatus can also achieve beneficial effects (or advantages) of the communication method provided in the second aspect and/or the sixth aspect.

According to a ninth aspect, an embodiment of this application provides an apparatus, where the apparatus may be a base station. The apparatus includes processors or circuits or modules configured to perform the communication method provided in any one of the possible implementations of the third aspect. Therefore, the apparatus can also achieve beneficial effects (or advantages) of the communication method provided in the third aspect.

According to a tenth aspect, an embodiment of this application provides an apparatus, where the apparatus may be a core network device. The apparatus includes processors or circuits or modules configured to perform the communication method provided in any one of the possible implementations of the fourth aspect. Therefore, the apparatus can also achieve beneficial effects (or advantages) of the communication method provided in the fourth aspect.

According to an eleventh aspect, an embodiment of this application provides an apparatus, where the apparatus may be a terminal device. The apparatus includes a memory, a processor, and a transceiver. The processor is configured to invoke program code stored in the memory to perform the communication method provided in any one of the possible implementations of the first aspect and/or the fifth aspect.

According to a twelfth aspect, an embodiment of this application provides an apparatus, where the apparatus may be a network device. The apparatus includes a memory, a processor, and a transceiver. The processor is configured to invoke program code stored in the memory to perform the communication method provided in any one of the possible implementations of the second aspect and/or the sixth aspect.

According to a thirteenth aspect, an embodiment of this application provides an apparatus, where the apparatus may be a base station. The apparatus includes a memory, a processor, and a transceiver. The processor is configured to invoke program code stored in the memory to perform the communication method provided in any one of the third aspect and/or the possible implementations of the third aspect.

According to a fourteenth aspect, an embodiment of this application provides an apparatus, where the apparatus may be a core network device. The apparatus includes a memory, a processor, and a transceiver. The processor is configured to invoke program code stored in the memory to perform the communication method provided in any one of the fourth aspect and/or the possible implementations of the fourth aspect.

According to a fifteenth aspect, an embodiment of this application provides a computer-readable storage medium. The computer-readable storage medium stores instructions; and when the instructions are run on a computer, the computer is enabled to perform the communication method provided in any one of the possible implementations of the first aspect, the second aspect, the third aspect, the fourth aspect, the fifth aspect, or the sixth aspect, and achieve beneficial effects of the communication method provided in the first aspect, the second aspect, the third aspect, the fourth aspect, the fifth aspect, or the sixth aspect.

According to a sixteenth aspect, an embodiment of this application provides a computer program product including instructions. When the computer program product runs on a computer, the computer is enabled to perform the communication method provided in any one of the possible implementations of the first aspect, the second aspect, the third aspect, the fourth aspect, the fifth aspect, or the sixth aspect; and achieve beneficial effects of the communication method provided in the first aspect, the second aspect, the third aspect, the fourth aspect, the fifth aspect, or the sixth aspect.

According to a seventeenth aspect, an embodiment of this application provides a chip system. The chip system includes a processor, configured to support an apparatus to implement the functions in the first aspect, the second aspect, the third aspect, the fourth aspect, the fifth aspect, or the sixth aspect, for example, generating or processing information related to the communication method provided in the first aspect, the second aspect, the third aspect, the fourth aspect, the fifth aspect, or the sixth aspect. In a possible design, the chip system further includes a memory. The memory is configured to store program instructions and data needed by a terminal device. The chip system may include a chip, or may include a chip and other components.

According to an eighteenth aspect, an embodiment of this application provides a system, where the system includes a terminal device, a base station, and a network device as disclosed in this application.

In the embodiments of this application, the accuracy of the registration area information obtained by the terminal device can be improved. This avoids waste of communication resources caused by the inaccurate registration area information of the terminal device, and improves the communication resource utilization and the practicality of the communication network.

DESCRIPTION OF EMBODIMENTS

Figure 1:
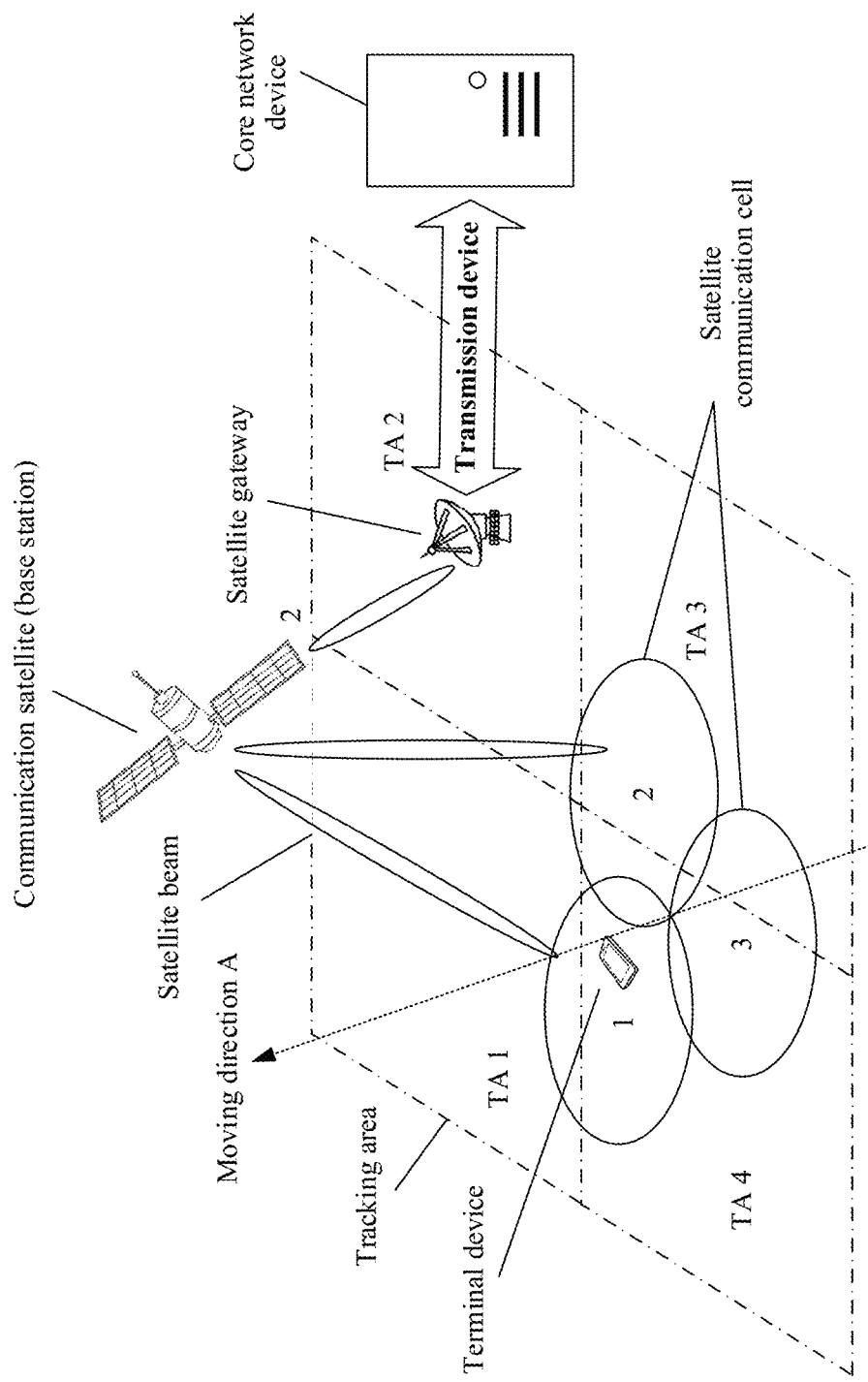
FIG. 1 is a schematic diagram of a communication system according to an embodiment of this application.

The following describes the technical solutions using various embodiments with reference to the accompanying drawings in the embodiments of this application.

The communication method disclosed in some embodiments of this application may be applicable to a satellite and non-terrestrial network communication system that uses an asynchronous satellite (which may be referred to as a satellite communication system below). In some embodiments, the satellite communication system may include a low-orbit satellite communication system, a medium-orbit satellite communication system, or a high-orbit satellite communication system. The communication method provided in the embodiments of this application may be further applicable to a terrestrial communication system that uses a mobile base station, for example, a 4G communication system or a 5G communication system that uses mobile base stations. In some embodiments, it may be understood that the terrestrial communication system may alternatively be another wireless communication system that uses various radio access technologies such as code division multiple access (CDMA), frequency division multiple access (FDMA), time division multiple access (TDMA), orthogonal frequency division multiple access (OFDMA), single-carrier frequency division multiple access (SC-FDMA), and multiple-input multiple-output (MIMO). The communication method provided in the embodiments of this application may be further applicable to a wide-area communication service system including a satellite communication system using a mobile satellite and the terrestrial communication system using mobile base stations. This is not limited herein.

Devices in the communication method provided in the embodiments of this application may include a terminal device (for example, user equipment (UE)) and a network device. The terminal device may be a wireless device that provides voice and/or data connectivity for a user. The wireless device may be a handheld device having a wireless connection function, another processing device connected to a wireless modem, or a mobile device communicating with one or more core network devices by using a radio access network. For example, the wireless device may be a mobile phone, a computer, a tablet computer, a personal digital assistant (PDA), a mobile Internet device (MID), a wearable device, and an e-book reader (e-book reader). For another example, the wireless device may alternatively be a portable, pocket-sized, handheld, computer built-in, or vehicle-mounted mobile device. For still another example, the wireless device may alternatively be a mobile station or an access point. For ease of description, the terminal device is used as an example for description in the embodiments of this application. The network device mainly includes a base station and a core network device. It should be noted that, in the satellite communication system, if the asynchronous satellite of the satellite communication system is a transparent satellite, the base station included in the network device is the asynchronous satellite. If the asynchronous satellite is a regenerative satellite, the asynchronous satellite is only used to forward information between the terminal device and the base station. In this case, the base station may be a terrestrial apparatus or device that is deployed on the radio access network (RAN) and that is used to provide a wireless communication function for the terminal device. The terrestrial apparatus or device may include a macro base station, a micro base station, a relay station, an access point base station controller, a transmission reception point (TRP), and other various forms. The core network device is an apparatus deployed on a core network (CN) to provide functions such as user connection, mobility management, supplementary service implementation, and an intelligent trigger for the terminal device. In the satellite communication system, the core network device mainly includes network elements such as a mobility management unit, an online charging unit, a service gateway, and the like.

In the embodiments of this application, a satellite communication system including an asynchronous satellite is used as an example to briefly describe the communication system and a working process involved in the communication method provided in the embodiments of this application. In referring to FIG. 1, FIG. 1 is a schematic diagram of an architecture of a communication system according to an embodiment of this application. A communication satellite shown in FIG. 1 is an asynchronous transparent satellite, which is a base station in the communication system. The base station and the ground are in a relative moving state. In the satellite communication system, the base station forms, by using beams in different directions, a plurality of satellite communication cells on the ground such as a satellite communication cell 1, a satellite communication cell 2, and a satellite communication cell 3 shown in FIG. 1. After establishing a connection to a satellite communication cell, a terminal device may perform information exchange with the base station. After receiving the information sent by the terminal device, the base station may forward the information to a satellite gateway (which may also be referred to as an earth station) on the ground. The satellite gateway then sends the information to a core network device using a transmission device, for example, an optical cable. Similarly, the core network device may also send the information to the terminal device through the transmission device to implement bi-directional transmission of information between the terminal device and the core network device.

The following briefly explains and describes related concepts in the embodiments of this application with reference to the schematic diagram of the structure of the communication system shown in FIG. 1.

1. Tracking Area (TA)

The tracking area is set by a communication system for location management of a terminal device, and is defined as a free movement area in which the terminal device does not need to update a service. The tracking area is similar to a location area or a routing area in a 2G communication system or a 3G communication system. In a communication system, tracking areas are usually statically delineated in advance, and there is no overlapping region between two tracking areas. For example, a tracking area TA 1, a tracking area TA 2, a tracking area TA 3, and a tracking area TA 4 are shown in FIG. 1. In an actual application, one tracking area is identified by one tracking area indicator (TAI). For example, the tracking area TA 1 may be identified by a tracking area indicator "TA 1". In the communication system shown in FIG. 1, the base station determines, based on coverage relationships between the one or more satellite communication cells formed by the base station on the ground and the tracking areas delineated in advance at different moments, one or more tracking areas associated with each satellite communication cell at the different moments. The information of the one or more tracking areas is broadcast in each satellite communication cell in a form of a tracking area list. In some embodiments, a tracking area associated with a satellite communication cell at a moment is a tracking area that has an overlapping area with the satellite communication cell. Generally, the base station mainly carries a tracking area list by using a system information block 1, and periodically broadcasts the tracking area list in the satellite communication cell. In a specific implementation, the tracking area list may include one or more pieces of tracking area information, and each piece of tracking area information may include an indicator of a communication network and indicators of the tracking areas. For example, the tracking area information corresponding to the tracking area TA 1 in the tracking area list may be [PLMN A, TA 1], and the tracking area information corresponding to the tracking area TA 2 in the tracking area list may be [PLMN A, TA 2]. For example, the base station forms three satellite communication cells, namely, the satellite communication cell 1, the satellite communication cell 2, and the satellite cell 3 on the ground by using the beams. At one point in time, the base station determines, by using the location information of the satellite communication cell 1 and the location information of each tracking area delineated in advance, that the satellite communication cell 1 has overlapping areas with the tracking area TA 1 and the tracking area TA 4. In this case, the system information block 1 broadcast by the base station in the satellite communication cell includes one tracking area list, and the tracking area list includes two pieces of tracking area information, namely, the [PLMN A, TA 1] and [PLMN A, TA 4]. Similarly, at the same time, the base station determines, by using location information of the satellite communication cell 2 and the location information of each tracking area delineated in advance, that the satellite communication cell 2 has overlapping areas with the tracking area TA 1, the tracking area TA 2, the tracking area TA 3, and the tracking area TA 4. In this case, the system information block 1 broadcast in the satellite communication cell 2 includes four pieces of tracking area information, namely, the [PLMN A, TA 1], the [PLMN A, TA 2], [PLMN A, TA 3], and the [PLMN A, TA 4].

2. Registration Area (RA)

An registration area includes one or more tracking areas, and is an area in which the terminal device can move freely and does not need to update registration area information. After the terminal device initiates an initial registration request, a mobility registration update request, or a periodic registration update request to the core network device, the core network device usually determines, based on information such as a context corresponding to the terminal device, the registration area information associated with the terminal device, and delivers the registration area information to the terminal device by using a registration update accept (registration accept) message. In some embodiments, the registration area information is used to configure a registration area associated with the terminal device for the terminal device. In other words, the registration area information indicates one or more tracking areas currently associated with the terminal device. In some embodiments, one piece of registration area information may be equivalent to one tracking area list. Generally, after being powered on for the first time, the terminal device first initiates the initial registration request to the core network device, to obtain initial information for the registration area, referred to as the initial registration area information in the description below. After obtaining the initial registration area information, if detecting that a preset registration update trigger condition is met, the terminal device initiates the mobility registration update request or the periodic registration update request to the core network device, to request the core network device to deliver new registration area information, and update the initial registration area information using the new registration area information. In this case, the tracking area associated with the terminal device becomes a tracking area indicated by the new registration area information. Similarly, when detecting the registration update trigger condition is met again, the terminal device repeats the foregoing operations. For example, refer to FIG. 1. It is assumed that a serving cell of a terminal device after being powered on is the satellite communication cell 2, the initial registration area information of the terminal device includes the TA 2 and the TA 3, in other words, registration areas of the terminal device include the tracking area TA 2 and the tracking area TA 3. Then, as the satellite moves at a high speed in a moving direction A, only the tracking area TA 1 and the tracking area TA 4 are broadcast by the satellite communication cell 2 at a certain point in time. In this case, the terminal device may determine that the tracking areas indicated by the initial registration area information of the terminal device do not have an overlapping area with a tracking area listened to by the terminal device, and the terminal device initiates a mobility registration update request to the core network device. For another example, when detecting that a preset registration update period arrives, the terminal device may further initiate the periodic registration update requests to the core network device.

In the communication system shown in FIG. 1, the registration area information received by the terminal device is determined by the core network device based on information such as the context of the terminal device. However, because the satellite communication cells formed by the base station move as the base station moves at a high speed, the tracking area list broadcast in the satellite communication cell changes rapidly over time. For a terminal device that is in a relatively static state with the ground or moves at a slow speed, because the registration area information associated with a satellite communication cell accessed by the terminal device changes continuously, the registration area information determined by the core network device based on information such as a context of the terminal device does not match the registration area information corresponding to the satellite communication cell connected to the terminal device. Therefore, the registration area information configured by the core network device for the terminal device cannot accurately represent the geographical location of the terminal device. As a result, the terminal device frequently initiates a registration update request to the core network device. This wastes communication resources of the communication network, and reduces practicability of the communication system.

A technical problem to be resolved in the communication method provided in this application is how to improve the accuracy of the registration area information to avoid the waste of the communication resources caused by inaccurate registration area information of the terminal device and to improve communication resource utilization and the practicality of the communication network.

Embodiment 1

Figure 2:
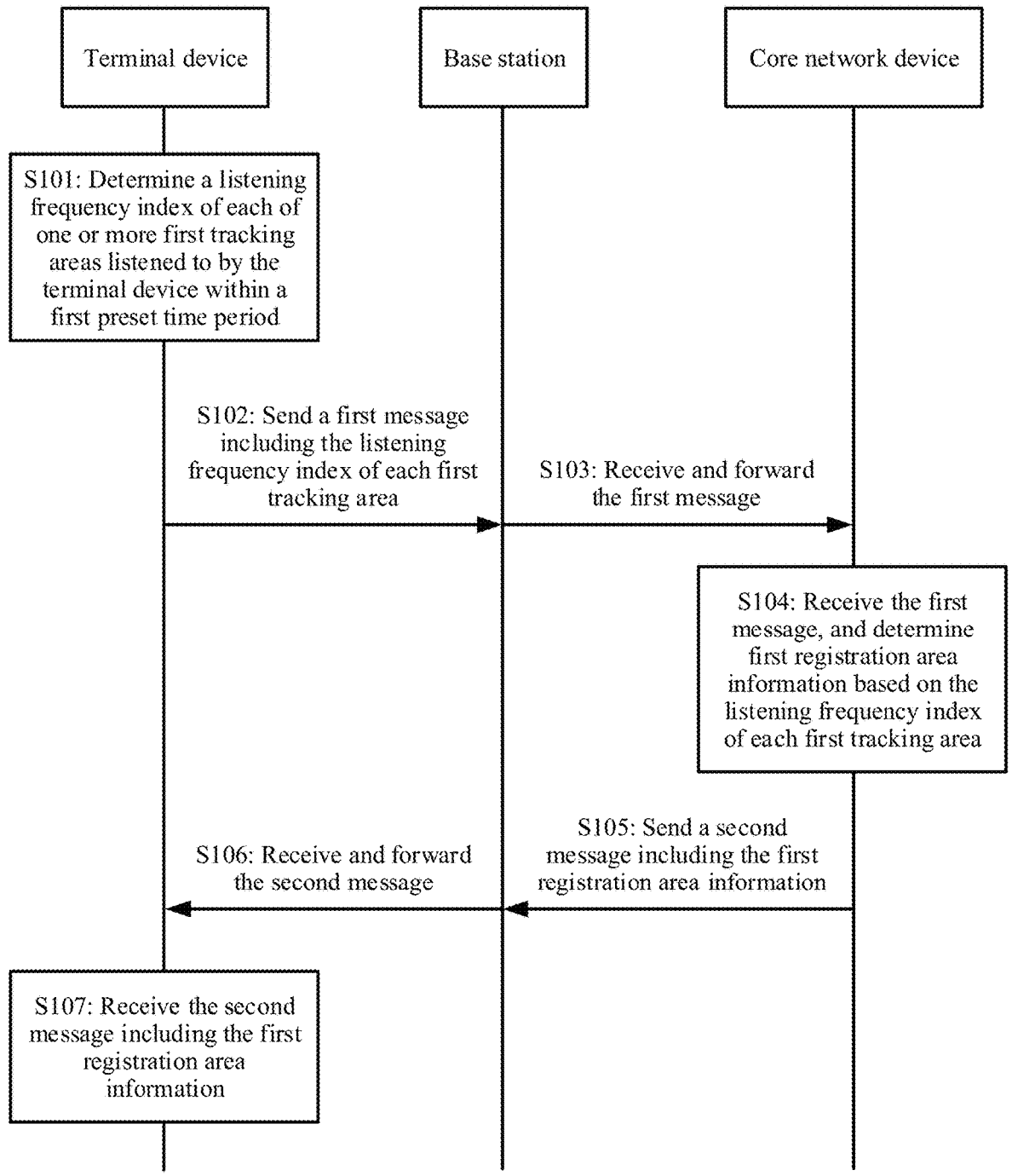
FIG. 2 is a schematic flowchart of a communication method according to an embodiment of this application.

In referring to FIG. 2, FIG. 2 is a schematic flowchart of a communication method according to an embodiment of this application. It can be learned from FIG. 2 that the communication method includes the following steps:

S101: A terminal device determines a listening frequency index of each of the one or more first tracking areas listened to by the terminal device within a first preset time period.

In some feasible implementations, when the terminal device needs to send a first message to a network device, the terminal device may first determine the listening frequency index of each first tracking area in the one or more first tracking areas (for ease of differentiation, the first tracking area is used as a substitute for description below) listened to by the terminal device within the first preset time period. In some embodiments, the listening frequency index corresponding to each first tracking area is used to indicate a frequency used by the terminal device to listen to each first tracking area within the first preset time period. The first preset time period is a time period before the terminal device determines that the terminal device needs to send the first message to a base station. In some embodiments, the specific duration of the first preset time period may be an empirical value obtained by performing a plurality of times of tests on the communication method proposed in this application.

In an implementation, when determining to send the first message to the network device, the terminal device may first obtain a tracking area listening historical record. In some embodiments, the tracking area listening historical record includes indicators corresponding to the one or more tracking areas that the terminal device has listened to and the listening moments at which the terminal device listens to the tracking areas. One tracking area corresponds to one or more listening moments. Optionally, the tracking area listening historical record may be stored in a memory of the terminal device, or may be stored in a cloud storage connected to the terminal device. This is not limited herein. In addition, it should be further noted that each time it is detected that a preset broadcast period arrives or a tracking area associated with a satellite communication cell of the base station changes, the base station broadcasts, in each satellite communication cell formed by the base station, a tracking area list corresponding to each satellite communication cell at a current moment by using a broadcast message. In this way, after the terminal device establishes a communication connection to the base station by using the satellite communication cell A, the terminal device may listen to the broadcast message that carries the tracking area list from the base station at different moments. After listening to the broadcast message that carries the tracking area list from the base station at a moment, the terminal device may store the indicators of the one or more tracking areas included in the tracking area list and the moment into the tracking area listening historical record. In an actual application, the tracking area listening historical record may be a tracking area listening historical record table as shown in Table 1-1. Table 1-1 is a tracking area listening historical record table according to an embodiment of this application. It can be learned from the table that the terminal device listens to a tracking area TA 1 and a tracking area TA 2 at time t0, listens to the tracking area TA 1 and a tracking area TA 3 at time t1, and so on.

TABLE 1-1

| Information of indicators | Listening moments | | | | | |
|---|---|---|---|---|---|---|
| TA 1 | t0 | t1 | t2 | t3 | t5 | t6 |
| TA 2 | t0 | | | t3 | | |
| TA 3 | | t1 | t2 | t3 | t4 | t5 | t6 |
| TA 4 | | | | t3 | | |

After obtaining the tracking area listening historical record, the terminal device may extract a tracking area listening historical record of the terminal device within the first preset time period from the tracking area listening historical record (for ease of differentiation, a target listening historical record is used as a substitute for description below), and determine, based on the indicators of the one or more tracking areas included in the target listening historical record and the one or more moments corresponding to an indicator of each tracking area, the one or more first tracking areas listened to by the terminal device within the first preset time period and the listening parameters corresponding to each first tracking area. In some embodiments, an end moment of the first preset time period is a moment at which the terminal device determines that the terminal device needs to send the first message. This embodiment of this application provides two methods of determining the listening parameters corresponding to each first tracking area, including a listening parameter determining method 1 and a listening parameter determining method 2.

Listening Parameter Determining Method 1

After obtaining the target listening historical record, the terminal device may determine, based on the indicators of the tracking areas included in the target listening historical record, the one or more first tracking areas listened to by the terminal device within the first preset time period. Then, the terminal device may further determine, based on the listening moments of each first tracking area included in the target listening historical record, listening duration corresponding to each first tracking area within the first preset time period. Then, the terminal device may determine the listening duration corresponding to each first tracking area as the listening parameter corresponding to each first tracking area. Alternatively, the terminal device may determine the indicator of each first tracking area and the listening duration corresponding to each first tracking area jointly as the listening parameters of each first tracking area. The following describes a process of determining the listening parameters of each first tracking area by using a scenario in which the listening duration corresponding to each first tracking area is the listening parameter corresponding to each first tracking area as an example. For example, refer to Table 1-1. It is assumed that a starting moment of the first preset time period is t2, and the ending moment of the first preset time period is t6. The terminal device separately listens, at five different times, namely, t2, t3, t4, t5, and t6, to tracking area information broadcast by the base station. For the first tracking area TA 1, the terminal device separately listens to the first tracking area TA 1 at four different times, namely, t2, t3, t5, and t6. In this case, the terminal device may determine that the listening duration corresponding to the first tracking area TA 1 is t4-t2+t6-t5, that is, a listening parameter corresponding to the first tracking area TA 1 is t4-t2+t6-t5. Similarly, for the first tracking area TA 2, if the terminal device listens to the first tracking area TA 2 at time t3, the terminal device may determine that listening duration corresponding to the first tracking area TA 2 is t4-t3, that is, a listening parameter corresponding to the first tracking area TA 2 is t4-t3. The rest may be deduced by analogy, and details are not described herein again.

Listening Parameter Determining Method 2

After obtaining the target listening historical record of the terminal device, the terminal device may determine, based on the indicators of the tracking areas included in the target listening historical record, the one or more first tracking areas listened to by the terminal device within the first preset time period. Then, the terminal device may further determine, based on the listening moments of each first tracking area included in the target listening historical record, a quantity of listening times corresponding to each first tracking area within the first preset time period. Then, the terminal device may determine the quantity of listening times corresponding to each first tracking area as the listening parameter corresponding to each first tracking area. Alternatively, the terminal device may determine the indicator of each first tracking area and the quantity of listening times corresponding to each first tracking area as the listening parameters of each first tracking area. The following describes the process of determining the listening parameters of each first tracking area by using a scenario in which the quantity of listening times corresponding to each first tracking area is the listening parameter corresponding to each first tracking area as an example. For example, refer to Table 1-1. It is assumed that the starting time of the first preset time period is t2, and the ending time of the first preset time period is t6. The terminal device separately listens to, at five different times, namely, t2, t3, t4, t5, and t6, the tracking area information broadcast by the base station. For the first tracking area TA 1, the terminal device separately listens to the first tracking area TA 1 at the four different times, namely, t2, t3, t5, and t6. In this case, the terminal device may determine that the quantity of listening times corresponding to the first tracking area TA 1 is 4, that is, the listening parameter corresponding to the first tracking area TA 1 is 4. Similarly, for the first tracking area TA 2, if the terminal device listens to the first tracking area TA 2 at time t3, the terminal device may determine that the quantity of listening times corresponding to the first tracking area TA 2 is 1, that is, the listening parameter corresponding to the first tracking area TA 2 is 1. The rest may be deduced by analogy, and details are not described herein again.

After determining the listening parameters corresponding to each first tracking area, the terminal device may determine, based on the listening parameters of each first tracking area and the first preset time period, the listening frequency index corresponding to each first tracking area. In an optional manner, when the listening parameter corresponding to each first tracking area is the listening duration of each first tracking area, the terminal device may separately calculate a ratio of the listening duration of each first tracking area to the first preset time period, and determines the ratio of the listening duration corresponding to each first tracking area to the first preset time period as the listening frequency index of each first tracking area. When the listening parameter corresponding to each first tracking area is the quantity of listening times of each first tracking area, the terminal device may separately calculate a ratio of the quantity of listening times of each first tracking area to the first preset time period, and determines the ratio of the quantity of listening times corresponding to each first tracking area to the first preset time period as the listening frequency index of each first tracking area. In another optional manner, after the terminal device calculates the ratio of the listening duration or the quantity of listening times of each first tracking area to the first preset time period, the terminal device may discretize, based on a preset discrete interval, the ratio of the listening duration or the quantity of listening times of each first tracking area to the first preset time period, to obtain a discrete value of the ratio of the listening duration or the quantity of listening times of each first tracking area to the first preset time period. Then, the discrete value corresponding to each first tracking area is determined as the listening frequency index of each first tracking area. In some embodiments, the ratio of the listening duration or the quantity of listening times of each first tracking area to the first preset time period is discretized, and the discrete value is used as the listening frequency index of each first tracking area, so that the listening frequency index of each first tracking area can be represented by using an integer number in the first message subsequently. This helps reduce signaling overhead of a communication network.

The following uses an example in which the listening parameter is the listening duration to describe a process in which the terminal device determines the listening frequency index of each first tracking area. Refer to Table 1-1. In some embodiments, it is assumed that the moment t0 is the $0^{th}$ minute, the moment t1 is the $10^{th}$ minute, and the moment t2 is the $20^{th}$ minute, the rest may be deduced by analogy, and the moment t6 is the $60^{th}$ minute. The starting moment of the first preset time period is t2, the ending moment of the first preset time period is t6, and total duration is 40 minutes. It can be learned from the content in the table that the listening duration of the first tracking area TA 1 within the first preset time period is 30 minutes. The listening duration of the first tracking area TA 2 within the first preset time period is 10 minutes. The listening duration of the first tracking area TA 3 within the first preset time period is 40 minutes. The listening duration of the first tracking area TA 4 within the first preset time period is 10 minutes. In this way, the terminal device may determine that a ratio of the listening duration corresponding to the first tracking area TA 1 to the first preset time period is 0.75, and a ratio of the listening duration corresponding to the first tracking area TA 2 to the first preset time period is 0.25. A ratio of the listening duration corresponding to the first tracking area TA 3 to the first preset time period is 1. A ratio of the listening duration corresponding to the first tracking area TA 4 to the first preset time period is 0.25. Then, the terminal device may determine that the listening frequency indexes corresponding to the first tracking area TA 1, the first tracking area TA 2, the first tracking area TA 3, and the first tracking area TA 4 are 0.75, 0.25, 1, and 0.25 respectively. Alternatively, after determining that the ratios corresponding to the first tracking area TA 1, the first tracking area TA 2, the first tracking area TA 3, and the first tracking area TA 4 are 0.75, 0.25, 1, and 0.25 respectively, the terminal device may discretize the four ratios based on the preset discrete interval. In some embodiments, it is assumed that a first discrete interval is [0, 0.25], and a corresponding discrete value is 1; a second discrete interval is [0.26, 0.5], and a corresponding discrete value is 2; a third discrete interval is [0.51, 0.75], and a corresponding discrete value is 3; and a fourth discrete interval is [0.76, 1], and a corresponding discrete value is 4. After discretizing the four ratios, the terminal device may determine that the discrete values corresponding to the first tracking area TA 1, the first tracking area TA 2, the first tracking area TA 3, and the first tracking area TA 4 are 3, 1, 4, and 1 respectively. To be specific, the listening frequency index of the first tracking area TA 1 is 3, the listening frequency index of the first tracking area TA 2 is 1, the listening frequency index of the first tracking area TA 3 is 4, and the listening frequency index of the first tracking area TA 4 is 1.

It should be additionally noted that, in some feasible implementations, when detecting that a preset communication trigger condition is met, the terminal device decides to send the first message to the base station.

In an optional manner, the communication trigger condition may be that when the terminal device detects that a preset communication period arrives. In other words, when the terminal device detects that the communication period arrives, the terminal device may determine that the terminal device needs to send the first message to the base station. In some embodiments, the communication period may be an empirical value obtained by performing a plurality of times of tests on the communication method proposed in this application.

In still another optional manner, the communication trigger condition is that one or more second tracking areas listened to by the terminal device are different from one or more third tracking areas indicated by the registration area information (for ease of differentiation, the second registration area information is used as a substitute for description below) obtained through a last registration area information update of the terminal device. In other words, each time the terminal device listens to the tracking area list broadcast by the base station, if the terminal device detects the one or more tracking areas (namely, the second tracking areas) included in the tracking area list and the one or more tracking areas (namely, the third tracking areas) indicated by the second registration area information obtained through the last registration area information update of the terminal device do not have an overlapping area, the terminal device may determine that the terminal device needs to send the first message to the base station. In some embodiments, the first message may be specifically a registration update request message.

In still another optional manner, the communication trigger condition includes that a sum of one or more listening frequency indexes of one or more decision tracking areas is less than a trigger decision threshold. The decision tracking area is a shared or overlapping tracking area between the one or more second tracking areas listened to by the terminal device and the one or more third tracking areas indicated by the second registration area information obtained through the last registration area information update of the terminal device. In other words, each time the terminal device listens to the one or more second tracking areas broadcast by the base station, the terminal device may determine one or more tracking areas that are the same as the one or more third tracking areas obtained through the last registration area information update of the terminal device in the one or more second tracking areas as the decision tracking areas. Then, the terminal device may determine a listening frequency index of each decision tracking area based on a second preset time period and the listening parameters corresponding to each decision tracking area within the second preset time period. In some embodiments, the ending moment of the second preset time period is the moment at which the terminal device listens to the one or more second tracking areas broadcast by the base station. For a process in which the terminal device determines the listening frequency index of each decision tracking area, refer to the foregoing process of determining the listening frequency index of each first tracking area. Details are not described herein again. Then, the terminal device may determine the sum of the listening frequency indexes of the decision tracking areas, and compare the sum of the listening frequency indexes of the decision tracking areas with the preset trigger decision threshold. If the terminal device determines that the sum of the listening frequency indexes of the decision tracking areas is less than the trigger decision threshold, the terminal device determines that the terminal device needs to send the first message to the base station. If the terminal device determines that the sum of the listening frequency indexes of the decision tracking areas is equal to or greater than the trigger decision threshold, the terminal device may continue to wait for a new second tracking area, and repeat the foregoing determining operations.

In some feasible manners, the first message further includes one or more tracking areas (for ease of differentiation, fourth tracking areas are used as a substitute for description below) last listened to by the terminal device before the terminal device detects that the communication trigger condition is met. In some embodiments, the one or more fourth tracking areas may be subsequently used to determine first registration area information. Optionally, the first registration area information may be used to update the second registration area information obtained through the last registration area information update of the terminal device. The first registration area information may be further used by the terminal device to perform cell reselection. It may be understood that the functions of the first registration area information described herein are not all functions of the first registration area information. This is merely an example for description herein, and is not specifically limited.

S102: The terminal device sends the first message including the listening frequency index of each first tracking area to the base station.

In some feasible implementations, after determining the listening frequency index of each first tracking area, the terminal device may pack the listening frequency indexes according to a communication protocol between the terminal device and the base station, to obtain the first message including the listening frequency index of each first tracking area. Optionally, in a specific implementation, the terminal device may first determine a listening frequency index field based on the listening frequency index of each first tracking area, where the listening frequency index field includes the indicator of each first tracking area and the listening frequency index of each first tracking area. Then, the terminal device may pack the listening frequency index field into the registration update request message, to obtain the first message. After obtaining the first message, the terminal device may send the first message to the base station on a channel resource allocated by the base station to the terminal device.

S103: The base station receives the first message, and forwards the first message to a core network device.

In some feasible implementations, after receiving the first message sent by the terminal device on the channel resource, the base station (namely, a communication satellite) may forward the first message to the core network device by using a satellite gateway and a transmission device. In some embodiments, a message sent by the base station to the core network device may be a first message that is not modified by the base station, or may be a first message that is modified by the base station according to a communication protocol between the base station and the core network device (for ease of understanding, a third message is used as a substitute for description below). It may be understood that the third message includes at least the listening frequency index of each first tracking area.

S104: The core network device receives the first message, and determines the first registration area information based on the listening frequency index of each first tracking area.

In some feasible implementations, the core network device may receive the first message or the third message from the base station by using the transmission device. Then, the listening frequency index of each first tracking area is extracted from the first message or the third message, and the first registration area information is determined based on the listening frequency index of each first tracking area.

When the first message does not include the one or more fourth tracking areas, in an optional specific implementation, after obtaining the listening frequency index of each first tracking area, the core network device may obtain a preset listening frequency index threshold. Then, the core network device may select one or more target tracking areas from the first tracking areas. In some embodiments, the target tracking area is a first tracking area whose listening frequency index is equal to or greater than the listening frequency index threshold. Finally, the core network device determines an indicator of each target tracking area based on the indicator of each first tracking area, and determines the first registration area information based on the indicator of each target tracking area. In some embodiments, the first registration area information includes the indicator of each target tracking area.

In another optional specific implementation, after obtaining the listening frequency index of each first tracking area, the core network device may obtain the preset listening frequency index threshold. Then, the core network device may first sort the listening frequency indexes of the first tracking areas in a descending order, and determine whether a listening frequency index whose ranking order is the first is equal to or greater than the listening frequency index threshold. If the core network device determines that the listening frequency index whose ranking order is the first is equal to or greater than the listening frequency index threshold, the core network device may determine a first tracking area corresponding to the listening frequency index whose ranking order is the first as a target tracking area. If the core network device determines that the listening frequency index whose ranking order is the first is less than the listening frequency index threshold, the core network device may calculate a sum value of the listening frequency index whose ranking order is the first and a listening frequency index whose ranking order is the second, and determine whether the sum value is equal to or greater than the listening frequency index threshold. If the core network device determines that the sum value is equal to or greater than the listening frequency index threshold, the core network device may select two first tracking areas corresponding to the listening frequency index whose ranking order is the first and the listening frequency index whose ranking order as the second as target tracking areas. If the core network device determines that the sum value is less than the listening frequency index threshold, the core network device may continue to select the listening frequency index whose ranking order is the first, the listening frequency index whose ranking order is the second, and a listening frequency index whose ranking order is the third, and repeat the foregoing summation and determining operations until that one or more target tracking areas corresponding to the listening frequency indexes whose orders are higher and the sum of the listening frequency indexes is equal to or greater than the listening frequency index threshold are determined. In other words, the core network device may determine the one or more target tracking areas from the one or more first tracking areas based on the listening frequency index threshold and the listening frequency index of each first tracking area. In addition, the listening frequency indexes of the one or more target tracking areas are both greater than the listening frequency indexes of non-target tracking areas. In some embodiments, the non-target tracking areas are first tracking areas in the one or more first tracking areas other than the one or more target tracking areas. Finally, the core network device may determine the indicator of each target tracking area based on the indicator of each first tracking area, and determine the first registration area information based on the indicator of each target tracking area.

In some embodiments of this application, the one or more target tracking areas frequently listened to by the terminal device are selected based on the listening frequency index of each first tracking area, and the first registration area information corresponding to the terminal device is determined based on the indicators of the target tracking areas, so that the determined first registration area information can more accurately represent the geographical location of the terminal device.

When the first message includes the one or more fourth tracking areas last listened to by the terminal device before the terminal device detects that the communication trigger condition is met, in an optional implementation, after obtaining the listening frequency index of each first tracking area, the core network device may obtain the preset listening frequency index threshold. Then, the core network device may select one or more candidate tracking areas from the first tracking areas. In some embodiments, the candidate tracking area is a first tracking area whose listening frequency index is equal to or greater than the listening frequency index threshold. Then, the terminal device may determine the one or more target tracking areas based on the one or more candidate tracking areas and the one or more fourth tracking areas. In some embodiments, the one or more target tracking areas include all the candidate tracking areas and the fourth tracking areas, and there is no duplicate tracking area. Finally, the core network device determines the indicator of each target tracking area based on the indicator of each first tracking area and the indicator of each fourth tracking area, and determines the first registration area information based on the indicator of each target tracking area. In some embodiments, the first registration area information includes the indicator of each target tracking area.

In another optional implementation, after obtaining the listening frequency index of each first tracking area, the core network device may obtain the preset listening frequency index threshold. Then, the one or more candidate tracking areas are selected from the first tracking areas in the foregoing manner in which the target tracking areas are first selected by sorting the listening frequency indexes, and then based on the sum value of the listening frequency indexes and the listening frequency index threshold. Then, the terminal device may determine the one or more target tracking areas based on the one or more candidate tracking areas and the one or more fourth tracking areas. In some embodiments, the one or more target tracking areas include all the candidate tracking areas and the fourth tracking areas, and there is no duplicate tracking area. Finally, the core network device determines the indicator of each target tracking area based on the indicator of each first tracking area and an indicator of each fourth tracking area, and determines the first registration area information based on the indicator of each target tracking area. In some embodiments, the first registration area information includes the indicator of each target tracking area.

S105: The core network device sends a second message including the first registration area information to the base station.

In some feasible implementations, after determining the first registration area information, the core network device may pack the first registration area information according to the communication protocol between the core network device and the base station, to obtain the second message including the first registration area information. Optionally, in a specific implementation, the core network device may first determine one registration area information field based on the first registration area information, where the registration area information field includes the indicators of one or more target tracking areas. Then, the core network device may pack the registration area information field into a registration update receive message, to obtain the second message. After obtaining the second message, the core network device may send the second message to the base station on a channel resource allocated by the base station to the core network device.

S106: The base station receives and forwards the second message to the terminal device.

In some feasible implementations, after receiving the second message sent by the core network device on the channel resource, the base station may forward the second message to the terminal device on the channel resource configured by the base station for the terminal device. In some embodiments, a message sent by the base station to the terminal device may be a second message that is not modified by the base station, or may be a second message that is modified by the base station according to the communication protocol between the base station and the terminal device (for ease of understanding, a fourth message is used as a substitute for description below). It may be understood that first registration area information included in the fourth message is the same as the first registration area information included in the second message.

S107: The terminal device receives the second message, and extracts the first registration area information.

In some feasible implementations, after receiving the second message or the fourth message, the terminal device may parse the second message or the fourth message according to the communication protocol between the terminal device and the base station, to extract the first registration area information included in the second message or the fourth message.

Optionally, after obtaining the first registration area information, the terminal device may update, based on the first registration area information, the second registration area information obtained through the last registration area information update of the terminal device. Because the first registration area information more accurately represents the geographical location of the terminal device, the tracking area indicated by the registration area information (namely, the first registration area information), obtained through the update and associated with the terminal device can better match a tracking area covered by a satellite communication cell connected to the terminal device. In this way, the quantity of times of initiating a registration area information update request by the terminal device can be effectively reduced. This avoids waste of communication resources of the communication network.

Optionally, after obtaining the first registration area information, the terminal device may further estimate the geographical location of the terminal device based on the first registration area information, to quickly determine one or more satellite communication neighboring cells to which the terminal device can establish connections. This improves efficiency of certain operations, for example, cell reselection by the terminal device, and further improves applicability and practicability of the communication network.

In an embodiment of this application, the terminal device sends the listening frequency indexes of the one or more first tracking areas listened to by the terminal device within the first preset time period to the core network device by using the base station. Then, the core network device may determine, based on the listening frequency index of each first tracking area, the tracking areas frequently listened to by the terminal device recently, form the first registration area information by using the information about the tracking areas, and send the first registration area information to the terminal device via the base station. Because the registration area information determined by the core network device based on the listening frequency index of each first tracking area has higher precision, the geographical location of the terminal device can be more accurately represented, and the problem that the terminal device frequently initiates the registration update request to the core network device caused by inaccurate registration area information is avoided. In addition, it is convenient for the terminal device to perform certain operations, for example, the cell reselection. This reduces the waste of the communication resources of the communication network, and improves communication resource utilization and the applicability of the communication network.

Figure 3:
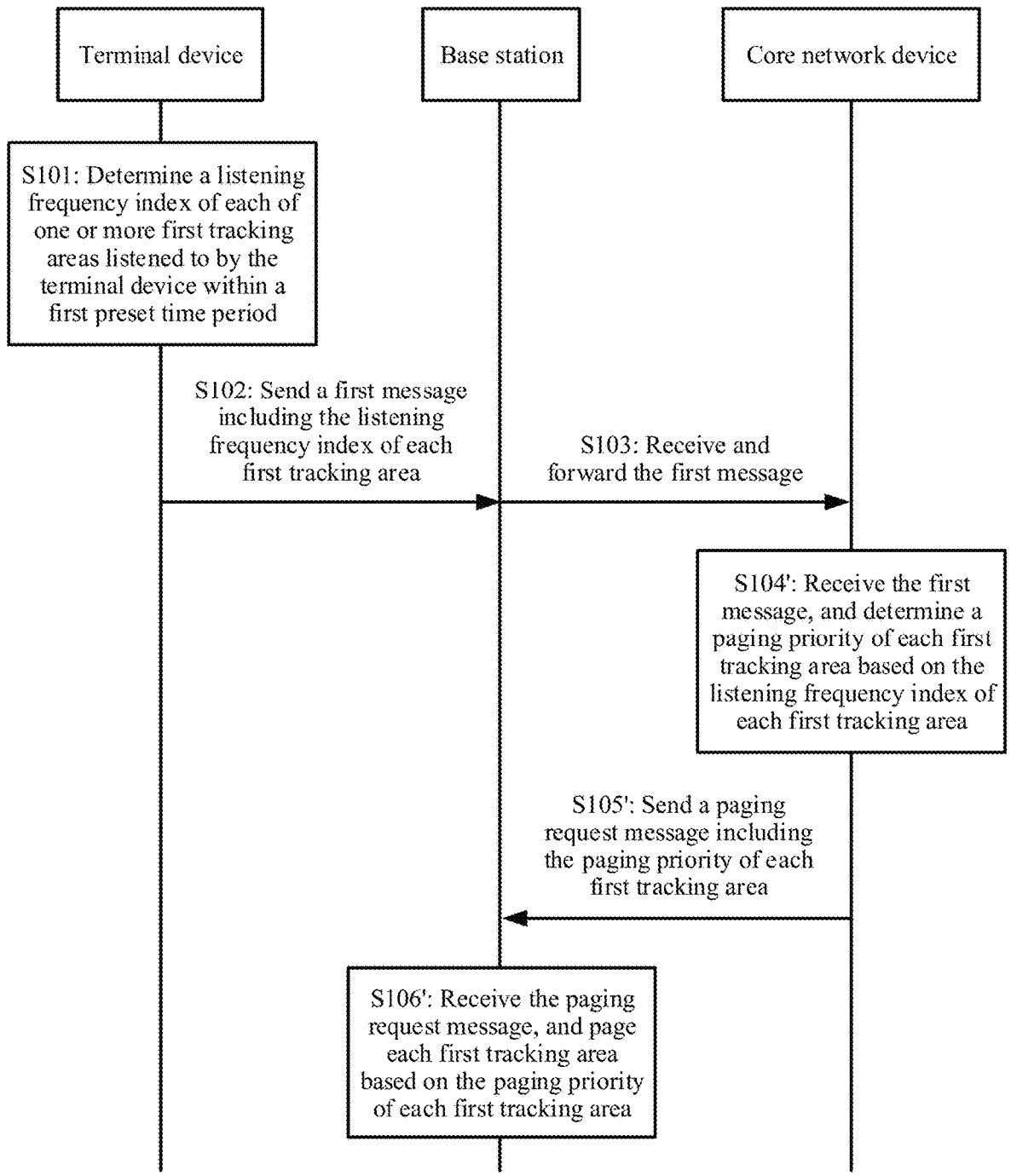
FIG. 3 is another schematic flowchart of a communication method according to an embodiment of this application.

For some feasible implementations, refer to FIG. 3. FIG. 3 is a schematic flowchart of a communication method according to an embodiment of this application. It can be learned from FIG. 3 that after step S103 is completed, the communication method further includes the following steps:

S104': The core network device receives the first message, and determines a paging priority for each first tracking area based on the listening frequency index of each first tracking area.

In some feasible implementations, after receiving the first message or the fourth message from the base station, the core network device may extract the listening frequency index of each first tracking area from the first message or the fourth message. Then, the core network device may determine the paging priority of each first tracking area based on the listening frequency index of each first tracking area. In some embodiments, a first tracking area having a higher listening frequency index has a higher paging priority. Optionally, after obtaining the listening frequency index of each first tracking area, the core network device may first select one or more to-be-paged tracking areas from the one or more first tracking areas based on a preset paging threshold. In some embodiments, the to-be-paged tracking area is a first tracking area whose listening frequency index is equal to or greater than the paging threshold. Then, the core network device may determine a paging priority for each to-be-paged tracking area based on a value of a listening frequency index of each to-be-paged tracking area. In some embodiments, a to-be-paged tracking area having a higher listening frequency index has a higher paging priority.

S105': The core network device sends a paging request message including the paging priority of each first tracking area to the base station.

In some feasible implementations, after determining the paging priority of each first tracking area or the paging priority of each to-be-paged tracking area, the core network device may pack the paging priority of each first tracking area or the paging priority of each to-be-paged tracking area according to the communication protocol between the core network device and the base station, into the paging request message. Then, the core network device may send the paging request information to the base station on the communication resource configured by the base station for the core network device.

S106': The base station receives the paging request message, and pages each first tracking area based on the paging priority of each first tracking area.

In some feasible implementations, after receiving the paging request message, the base station may parse the paging request message according to the communication protocol between the base station and the core network device, to obtain the paging priority of each first tracking area or the paging priority of each to-be-paged tracking area. Then, the base station may sequentially initiate, based on the paging priority of each first tracking area, paging to the terminal device in the satellite communication cells covered by the first tracking areas. Alternatively, the base station may sequentially initiate, based on the paging priority of each to-be-paged tracking area, paging to the terminal device in satellite communication cells covered by the to-be-paged tracking areas.

The tracking areas where the terminal device is paged and the paging priority of each tracking area to be used to page the terminal device are determined based on the listening frequency index of each first tracking area provided by the terminal device, so that ineffective paging operations performed in some tracking areas far from the terminal device can be reduced. In addition, the speed of paging the terminal device may be improved by using a paging priority. This reduces the communication resources of the communication network, and improves applicability of the communication network.

Figure 4:
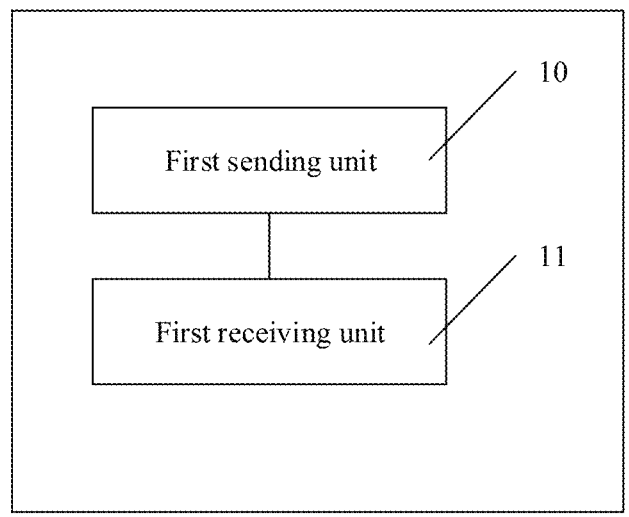
FIG. 4 is a schematic diagram of an apparatus according to another embodiment of this application.

In referring to FIG. 4. FIG. 4 is a schematic diagram of a structure of an apparatus according to an embodiment of this application. The apparatus may be a terminal device. The apparatus includes:

a first sending unit 10, configured to send a first message to a network device, where the first message includes one or more listening frequency indexes of one or more first tracking areas; the one or more first tracking areas are tracking areas listened to by the apparatus within a first preset time period; and the one or more listening frequency indexes are used to indicate a frequency used by the apparatus to listen to the one or more first tracking areas within the first preset time period; and a first receiving unit 11, configured to receive a second message including first registration area information from the network device, where the first registration area information is determined based on the one or more listening frequency indexes.

In a feasible implementation, the one or more listening frequency indexes are determined based on the first preset time period and one or more listening parameters of the one or more first tracking areas, and the listening parameters include a listening duration or a quantity of listening times.

In a feasible implementation, the one or more listening frequency indexes are determined based on a discrete value of a ratio of the one or more listening parameters to the first preset time period.

Figure 5:
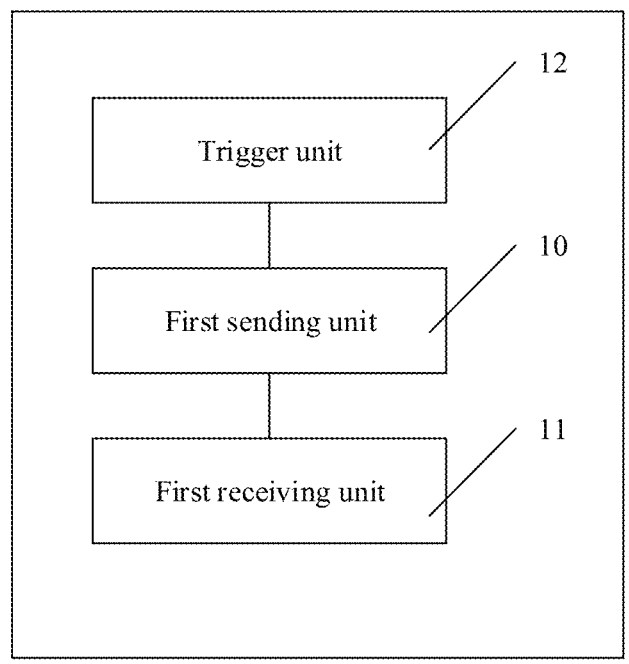
FIG. 5 is a schematic diagram of an apparatus according to another embodiment of this application.

For a feasible implementation, refer to FIG. 5. FIG. 5 is a schematic diagram of another structure of an apparatus according to an embodiment of this application. The apparatus further includes a trigger unit 12, configured to: when detecting that a communication trigger condition is met, determine to send the first message to the network device.

In a feasible implementation, the communication trigger condition includes that one or more second tracking areas listened to by the first receiving unit 11 are different from one or more third tracking areas indicated by second registration area information obtained through a last registration area information update of the first receiving unit 11.

In a feasible implementation, the communication trigger condition includes that a sum of one or more listening frequency indexes of one or more decision tracking areas is less than a trigger decision threshold. The decision tracking area is a shared or overlapping tracking area between one or more second tracking areas listened to by the first receiving unit and one or more third tracking areas indicated by second registration area information obtained through a last registration area information update of the first receiving unit.

In a feasible implementation, the one or more listening frequency indexes are determined based on a second preset time period and one or more listening parameters of the one or more decision tracking areas, and the listening parameters include a listening duration or a quantity of listening times.

In a feasible implementation, the first registration area information is used to update the second registration area information obtained through the last registration area information update of the apparatus.

In a feasible implementation, the first message is a registration update request message, and/or the second message is a registration update receive message.

In a feasible implementation, the first message further includes one or more fourth tracking areas last listened to by the trigger unit before the trigger unit detects that the communication trigger condition is met, and the one or more fourth tracking areas are used to determine the first registration area information.

In a feasible implementation, the first sending unit 10 sends the first message to the network device. In some embodiments, the first message includes the one or more listening frequency indexes of the one or more first tracking areas. For a process in which the first sending unit 10 sends the first message to the network device, refer to the processes of determining and sending the first message to the network device described in step S101 and step S102 in the embodiments, and details are not described herein again. The first receiving unit 11 may receive the second message from the network device. For a specific embodiment, refer to the process described in step S107 described above, and details are not described herein again.

Figure 6:
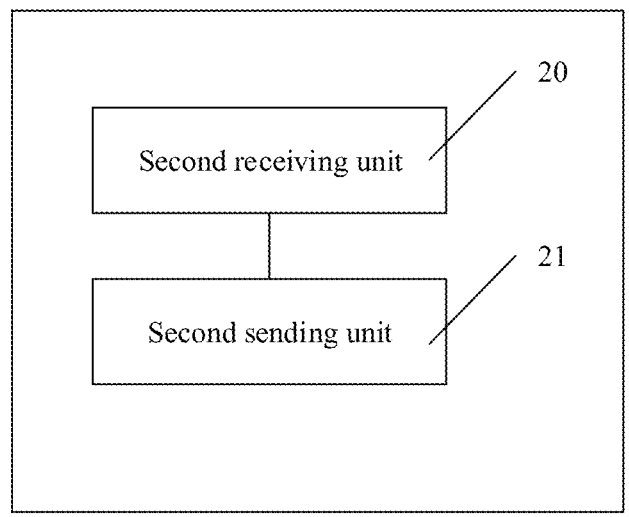
FIG. 6 is a schematic diagram of an apparatus according to another embodiment of this application.

In referring to FIG. 6, FIG. 6 is a schematic diagram of another structure of an apparatus according to an embodiment of this application. The apparatus may be a network device. The apparatus includes:

a second receiving unit 20, configured to receive the first message from the terminal device, where the first message includes the one or more listening frequency indexes of the one or more first tracking areas listened to by the terminal device within the first preset time period, and the one or more listening frequency indexes are used to indicate the frequency of listening to the one or more first tracking areas by the terminal device within the first preset time period; and a second sending unit 21, configured to send the second message including the first registration area information to the terminal device. The first registration area information is determined based on the one or more listening frequency indexes.

Figure 7:
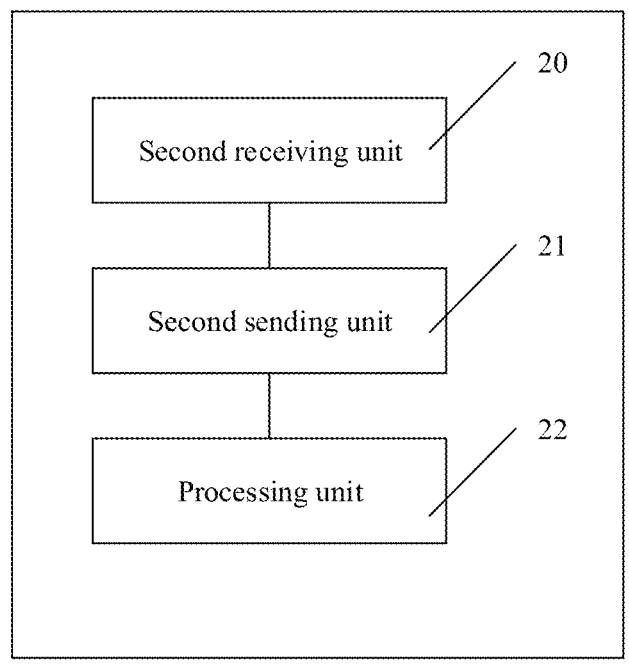
FIG. 7 is a schematic diagram of an apparatus according to another embodiment of this application.

For a feasible implementation, refer to FIG. 7. FIG. 7 is a schematic diagram of another structure of an apparatus according to an embodiment of this application. It can be learned from FIG. 7 that the apparatus further includes a processing unit 22 configured to obtain a listening frequency index threshold. The listening frequency index threshold is used to select the one or more first tracking areas.

In a feasible implementation, the processing unit 22 is further configured to determine one or more target tracking areas from the one or more first tracking areas based on the listening frequency index threshold and the one or more listening frequency indexes. The processing unit 22 is further configured to determine the first registration area information. The first registration area information includes one or more indicators of the one or more target tracking areas.

In a feasible implementation, the target tracking area is a first tracking area whose listening frequency index is equal to or greater than the listening frequency index threshold.

In a feasible implementation, a sum of one or more listening frequency indexes of the one or more target tracking areas is equal to or greater than the listening frequency index threshold; the one or more listening frequency indexes of the one or more target tracking areas are greater than one or more listening frequency indexes of one or more non-target tracking areas; and the non-target tracking areas are first tracking areas in the one or more first tracking areas other than the one or more target tracking areas.

In a feasible implementation, the first message further includes one or more fourth tracking areas last listened to by the terminal device before the terminal device detects that the communication trigger condition is met, and the one or more fourth tracking areas are used to determine the first registration area information.

In a feasible implementation, the processing unit 22 is configured to determine one or more candidate tracking areas from the one or more first tracking areas based on the listening frequency index threshold obtained by the processing unit and the one or more listening frequency indexes obtained by the second receiving unit.

The processing unit 22 is further configured to determine one or more target tracking areas based on the one or more candidate tracking areas and the one or more fourth tracking areas.

The processing unit 22 is further configured to determine the first registration area information, where the first registration area information includes one or more indicators of the one or more target tracking areas.

In a feasible implementation, the candidate tracking area is a first tracking area whose listening frequency index is equal to or greater than the listening frequency index threshold.

In a feasible implementation, a sum of one or more listening frequency indexes of the one or more candidate tracking areas is equal to or greater than the listening frequency index threshold; the one or more listening frequency indexes of the one or more candidate tracking areas are greater than the one or more listening frequency indexes of one or more non-candidate tracking areas; and the non-candidate tracking areas are first tracking areas in the one or more first tracking areas other than the one or more candidate tracking areas In a feasible implementation, the first message is a registration update request message, and/or the second message is a registration update receive message.

Figure 8:
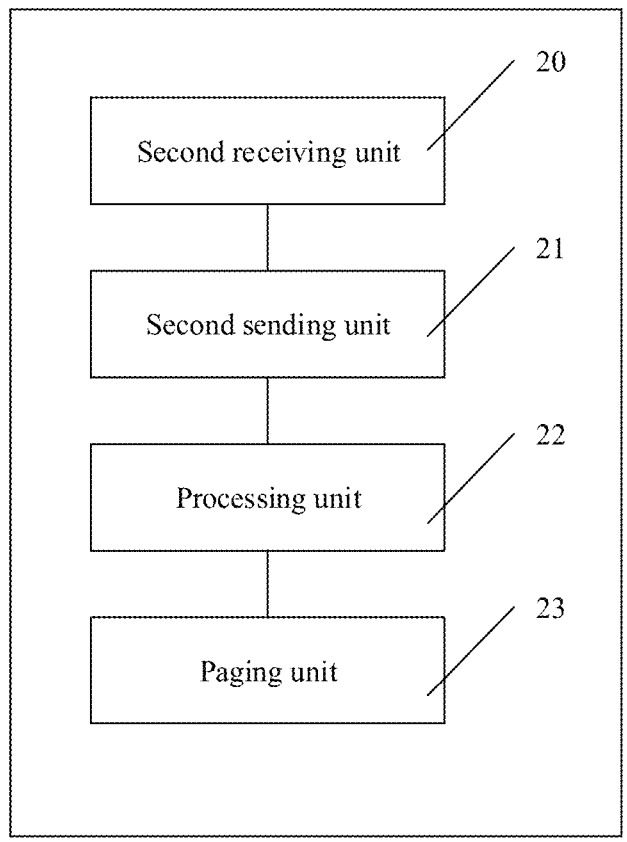
FIG. 8 is a schematic diagram of an apparatus according to another embodiment of this application.

In a feasible implementation, refer to FIG. 8. FIG. 8 is a schematic diagram of another structure of an apparatus according to an embodiment of this application. The apparatus further includes a paging unit 23 configured to page the one or more first tracking areas, where the paging priorities corresponding to the one or more first tracking areas are determined based on the one or more listening frequency indexes. A paging priority corresponding to a first tracking area whose listening frequency index is a first parameter is higher than a paging priority corresponding to a first tracking area whose listening frequency index is a second parameter, and the first parameter is greater than the second parameter.

In some feasible implementations, the second receiving unit 20 may receive the first message from the terminal device. For an example embodiment, refer to the process of receiving the first message described in step S104 described above, and details are not described herein again. The second sending unit 21 may send the second message including the first registration area information to the terminal device. For a specific process, refer to a process of sending the second message described in step S105 and step S106 described above, and details are not described herein again.

Figure 9:
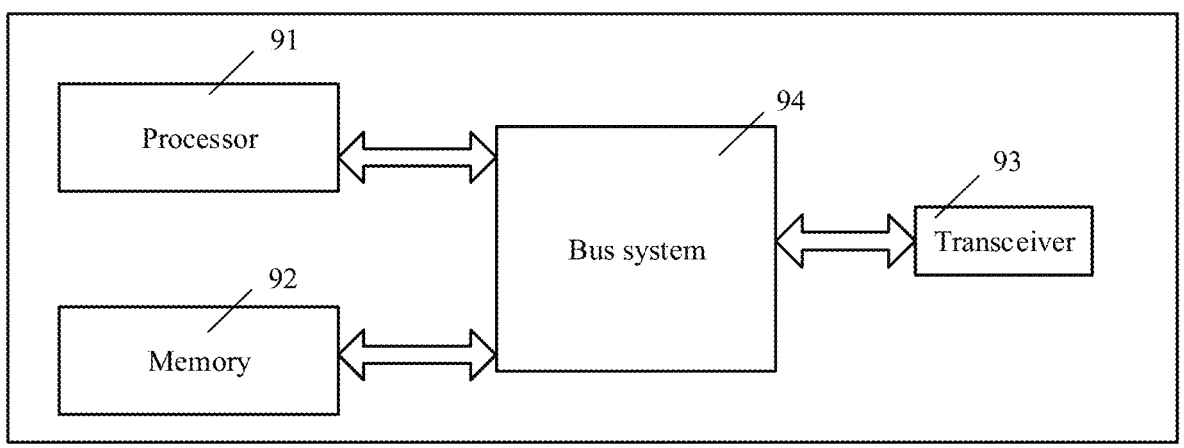
FIG. 9 is a schematic diagram of an apparatus according to another embodiment of this application.

In referring to FIG. 9, FIG. 9 is a schematic diagram of another structure of an apparatus according to an embodiment of this application. The apparatus may be a terminal device. The apparatus includes a processor 91, a memory 92, and a transceiver 93. Optionally, the processor 91, the memory 92, and the transceiver 93 may be connected using a bus system 94.

The memory 92 includes but is not limited to a RAM, a ROM, an EPROM, or a CD-ROM. The memory 92 is configured to store related instructions and data. The memory 92 stores the following elements: an executable module or a data structure, a subset thereof, or an extended set thereof:

an operation instruction that includes various operation instructions and is used to implement various operations; and an operating system that includes various system programs and is used to implement various basic services and process a hardware-based task.

FIG. 9 shows only one memory. Certainly, a plurality of memories may be alternatively disposed based on a requirement.

The transceiver 93 may be a communication module or a transceiver circuit, and is configured to transmit or receive information such as data and signaling for the terminal device. In this embodiment of this application, the transceiver 93 is configured to perform operations such as sending a first message and receiving a second message in the above-described embodiments.

The processor 91 may be a controller, a CPU, a general-purpose processor, a DSP, an ASIC, an FPGA, or another programmable logic device, a transistor logic device, a hardware component, or any combination thereof. The processor 91 may implement or execute various example logical blocks, modules, and circuits described with reference to content disclosed in the embodiments of this application. The processor 91 may alternatively be a combination of computing functions, for example, a combination of one or more microprocessors or a combination of a DSP and a microprocessor.

In specific application, components of an electronic device are coupled together by using the bus system 94. In addition to a data bus, the bus system 94 may further include a power bus, a control bus, a status signal bus, and the like. However, for clear description, various types of buses in the FIG. 9 are marked as the bus system 94. For ease of illustration, FIG. 9 merely shows an example of the bus system 94.

Figure 10:
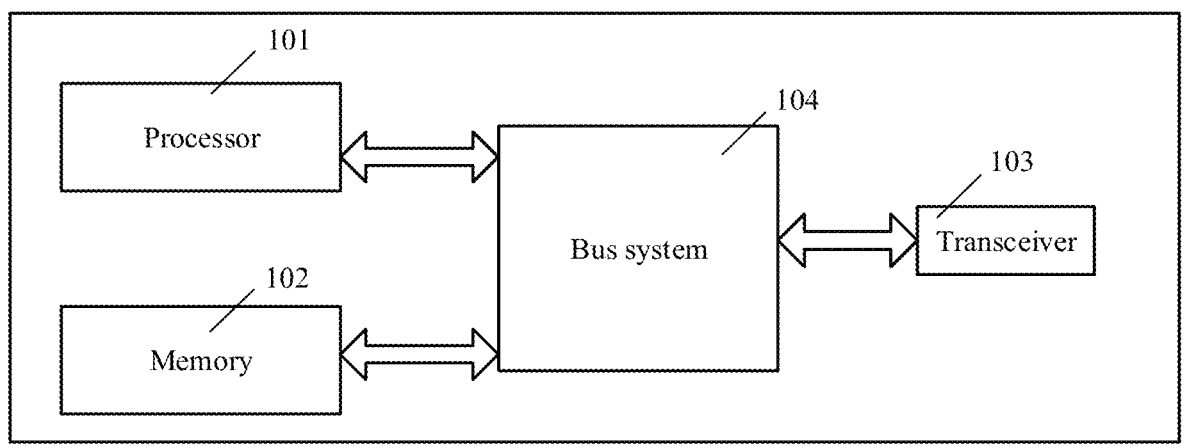
FIG. 10 is a schematic diagram of an apparatus according to another embodiment of this application.

Refer to FIG. 10. FIG. 10 is a schematic diagram of another structure of an apparatus according to an embodiment of this application. The apparatus may be a network device. The apparatus includes a processor 101, a memory 102, and a transceiver 103. Optionally, the processor 101, the memory 102, and the transceiver 103 may be connected by using a bus system 104.

The memory 102 includes but is not limited to a RAM, a ROM, an EPROM, or a CD-ROM. The memory 102 is configured to store related instructions and data. The memory 102 stores the following elements: an executable module or a data structure, a subset thereof, or an extended set thereof:

an operation instruction that includes various operation instructions and is used to implement various operations; and an operating system that includes various system programs and is used to implement various basic services and process a hardware-based task.

FIG. 10 shows only one memory. Certainly, a plurality of memories may be alternatively disposed based on a requirement.

The transceiver 103 may be a communication module or a transceiver circuit, and is configured to transmit information such as data and signaling between a server and a playback device. In this embodiment of this application, the transceiver 103 is configured to perform operations such as sending a first message and receiving a second message in the above-described embodiments.

The processor 101 may be a controller, a CPU, a general-purpose processor, a DSP, an ASIC, an FPGA, or another programmable logic device, a transistor logic device, a hardware component, or any combination thereof. The processor 101 may implement or execute various example logical blocks, modules, and circuits described with reference to content disclosed in the embodiments of this application. The processor 101 may alternatively be a combination of computing functions, for example, a combination of one or more microprocessors or a combination of a DSP and a microprocessor.

In specific application, components of an electronic device are coupled together by using the bus system 104. In addition to a data bus, the bus system 104 may further include a power bus, a control bus, a status signal bus, and the like. However, for clear description, various types of buses in the FIG. 10 are marked as the bus system 104. For ease of illustration, FIG. 10 merely shows an example of the bus system 104.

The communication method disclosed in the embodiments of this application may be applied to the processor 101, or implemented by the processor 101. The processor 101 may be an integrated circuit chip and has a signal processing capability.

An embodiment of this application provides a computer-readable storage medium. The computer-readable storage medium stores instructions. When the instructions are run on a computer, the communication method described above may be implemented.

The computer-readable storage medium may be an internal storage unit of the communication apparatus in the foregoing embodiments. Alternatively, the computer-readable storage medium may be an external storage device of the communication apparatus, for example, a plug-in hard disk, a smart media card (SMC), a secure digital (SD) card, or a flash card of the communication apparatus. Further, the computer-readable storage medium may alternatively include both an internal storage unit and an external storage device of the communication apparatus. The computer-readable storage medium is configured to store the computer program and other programs and data that are required by the communication apparatus. The computer-readable storage medium may be further configured to temporarily store data that has been output or is to be output.

A person of ordinary skill in the art may understand that all or some of the processes of the methods in the embodiments may be implemented by a computer program instructing related hardware. The program may be stored in a computer-readable storage medium. When the program runs, the processes of the methods in the embodiments are performed. The storage medium includes any medium that can store program code, for example, a ROM, a random access memory RAM, a magnetic disk, or an optical disc.

The foregoing description is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, wherein the method comprises:
   sending, by a terminal device, a first message to a network device, wherein the first message comprises one or more listening frequency indexes of one or more first tracking areas, the one or more first tracking areas are tracking areas listened to by the terminal device within a first preset time period, and the one or more listening frequency indexes are used to indicate a frequency used to listen to the one or more first tracking areas by the terminal device within the first preset time period; and
   receiving, by the terminal device, a second message comprising first registration area information from the network device, wherein the first registration area information is determined based on the one or more listening frequency indexes;
   wherein the one or more listening frequency indexes are determined based on a discrete value of a ratio of one or more listening parameters to the first preset time period and the one or more listening parameters of the one or more first tracking areas, and wherein the listening parameters comprise a listening duration or a quantity of listening times.

2. The method according to claim 1, wherein the method further comprises:
   when a communication trigger condition is met, sending, by the terminal device, the first message to the network device.

3. The method according to claim 2, wherein the communication trigger condition comprises that:
   one or more second tracking areas listened to by the terminal device are different from one or more third tracking areas indicated by second registration area information obtained through a last registration area information update of the terminal device; or
   a sum of one or more listening frequency indexes of one or more decision tracking areas is less than a trigger decision threshold, and each of the decision tracking area is a shared tracking area between one or more second tracking areas listened to by the terminal device and one or more third tracking areas indicated by second registration area information obtained through a last registration area information update of the terminal device.

4. The method according to claim 3, wherein the one or more listening frequency indexes of the one or more decision tracking areas are determined based on a second preset time period and one or more listening parameters of the one or more decision tracking areas, and the listening parameters comprise a listening duration or a quantity of listening times.

5. The method according to claim 1, wherein the first registration area information is used to update the second registration area information obtained through the last registration area information update of the terminal device.

6. A communication method, wherein the method comprises:
   receiving, by a network device, a first message from a terminal device, wherein the first message comprises one or more listening frequency indexes of one or more first tracking areas listened to by the terminal device within a first preset time period, and the one or more listening frequency indexes are used to indicate a frequency used by the terminal device to listen to the one or more first tracking areas within the first preset time period;
   sending, by the network device, a second message comprising first registration area information to the terminal device, wherein the first registration area information is determined based on the one or more listening frequency indexes; and
   obtaining, by the network device, a listening frequency index threshold, wherein the listening frequency index threshold is used to select the one or more first tracking areas.

7. The method according to claim 6, wherein the method further comprises:
   selecting, by the network device, one or more target tracking areas from the one or more first tracking areas based on the listening frequency index threshold and the one or more listening frequency indexes; and
   determining, by the network device, the first registration area information, wherein the first registration area information comprises one or more indicators of the one or more target tracking areas.

8. The method according to claim 7, wherein each of the one or more target tracking areas is a first tracking area whose listening frequency index is equal to or greater than the listening frequency index threshold.

9. The method according to claim 7, wherein a sum of one or more listening frequency indexes of the one or more target tracking areas is equal to or greater than the listening frequency index threshold; each of the one or more listening frequency indexes of the one or more target tracking areas is greater than any of one or more listening frequency indexes of one or more non-target tracking areas; and the non-target tracking areas are first tracking areas in the one or more first tracking areas other than the one or more target tracking areas.

10. The method according to claim 6, wherein the first message further comprises one or more fourth tracking areas last listened to by the terminal device before the terminal device detects that a communication trigger condition is met, and wherein the one or more fourth tracking areas are used to determine the first registration area information.

11. The method according to claim 10, wherein the method further comprises:
   determining, by the network device, one or more candidate tracking areas from the one or more first tracking areas based on the listening frequency index threshold and the one or more listening frequency indexes;
   determining, by the network device, one or more target tracking areas based on the one or more candidate tracking areas and the one or more fourth tracking areas; and
   determining, by the network device, the first registration area information, wherein the first registration area information comprises one or more indicators of the one or more target tracking areas.

12. The method according to claim 6, wherein the method further comprises:
   paging, by the network device, the one or more first tracking areas, wherein paging priorities corresponding to the one or more first tracking areas are determined based on the one or more listening frequency indexes, a first tracking area having a higher listening frequency index has a higher paging priority.

13. An apparatus, comprising a processor, a memory, and a transceiver, wherein
   the memory is configured to store a computer program; and
   the processor is configured to execute the computer program stored in the memory to:
      send, a first message to a network device, wherein the first message comprises one or more listening frequency indexes of one or more first tracking areas, the one or more first tracking areas are tracking areas listened to by the apparatus within a first preset time period, and the one or more listening frequency indexes are used to indicate a frequency used by the apparatus to listen to the one or more first tracking areas within the first preset time period; and
      receive, a second message comprising first registration area information from the network device, wherein the first registration area information is determined based on the one or more listening frequency indexes;
   wherein the one or more listening frequency indexes are determined based on a discrete value of a ratio of one or more listening parameters to the first preset time period and the one or more listening parameters of the one or more first tracking areas, and wherein the listening parameters comprise a listening duration or a quantity of listening times.

14. The apparatus according to claim 13, wherein the processor is further configured to execute the computer program stored in the memory to:
   send, when a communication trigger condition is met, the first message to the network device.

15. The apparatus according to claim 14, wherein the communication trigger condition comprises that:
   one or more second tracking areas listened to by the apparatus are different from one or more third tracking areas indicated by second registration area information obtained through a last registration area information update of the apparatus; or
   a sum of one or more listening frequency indexes of one or more decision tracking areas is less than a trigger decision threshold, and each of the decision tracking area is a shared tracking area between one or more second tracking areas listened to by the apparatus and one or more third tracking areas indicated by second registration area information obtained through a last registration area information update of the apparatus.

* * * * *